(12) United States Patent
Giuli

(10) Patent No.: US 8,009,026 B2
(45) Date of Patent: Aug. 30, 2011

(54) VEHICLE STATISTICAL MEASUREMENT GAME

(75) Inventor: Thomas J. Giuli, Ann Arbor, MI (US)

(73) Assignee: Ford Motor Company, Dearborn, MI (US)

( * ) Notice: Subject to any disclaimer, the term of this patent is extended or adjusted under 35 U.S.C. 154(b) by 288 days.

(21) Appl. No.: 12/389,405

(22) Filed: Feb. 20, 2009

(65) Prior Publication Data

US 2010/0214089 A1 Aug. 26, 2010

(51) Int. Cl.
*B60Q 1/00* (2006.01)
(52) U.S. Cl. ............ 340/439; 340/459; 455/575.9; 701/35
(58) Field of Classification Search ........... 340/425.5, 340/438, 439, 459; 455/99, 575.9; 701/35
See application file for complete search history.

(56) References Cited

U.S. PATENT DOCUMENTS

2006/0226967 A1* 10/2006 Tranchina .................. 340/447

OTHER PUBLICATIONS

Kermit Whitfield, "A hitchhiker's guide to the telematics ecosystem", Automotive Design & Production, Oct. 2003, http://findarticles.com, pp. 1-3.
Ford Motor Company, "SYNC with Navigation System," Owner's Guide Supplement, SYNC System Version 1 (Jul. 2007).
Ford Motor Company, "SYNC," Owner's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).

* cited by examiner

*Primary Examiner* — Brent Swarthout
(74) *Attorney, Agent, or Firm* — Jennifer Stec; Brooks Kushman P.C.

(57) ABSTRACT

A vehicle communication system is operable to calculate and compare vehicle statistics based on information received from a vehicle sensor. This statistic information can be used by the vehicle communication system to execute a plurality of statistic based games. Additionally, relevant statistic information may be transmitted to a remote network for the purpose of playing games against other drivers. The vehicle communication system can report statistical changes to a driver, thus appraising the driver of the driver's success in achieving statistical game goals. Network rankings may also be provided to the driver in a real-time basis by the vehicle communication system.

15 Claims, 5 Drawing Sheets

VEHICLE STATISTICAL MEASUREMENT GAME

TECHNICAL FIELD

The illustrative embodiments generally relate to a game played at least in part based on the measurement and/or comparison of one or more vehicles statistics.

BACKGROUND

With the 2008 spike of gasoline prices to over $4 per gallon, a significant amount of focus has been placed on fuel economy (increasing miles per gallon (MPG)) in vehicles. A large variety of devices that save fuel, or at least claim to save fuel have been released as aftermarket addons. These devices include, but are not limited to: magnets, fuel catalysts, platinum injection, injection enhancers, air bleed devices, turbulence generators, atomizers, oil additives, fuel additives, engine cleaners, electrical modifications, hydrogen generators and aerodynamic modifications (list from www.fuelsaving.info).

The environmental protection agency has done studies on a number of these devices, and their effectiveness varies wildly. In addition to these devices, however, it is generally agreed that drivers can take certain steps to conserve fuel without changing the composition of their engine.

Several non-limiting examples of these steps include:
Slowing down—driving above 50 mph may use additional fuel, for example, it has been noted that driving just 10% about 50 mpg uses 10-20% more fuel.
Closing windows and removing roof racks—this reduces air resistance and should help increase efficiency.
Rolling up to stop lights instead of speeding up to them and stopping fully—if the light changes, the car will not need to be accelerated as greatly to resume a proper driving speed.
Removing excess weight from the car—carrying extra weight uses more fuel.
Keeping tires inflated—GOODYEAR estimates that a 20% underinflated tire uses 10% more fuel to run.

All these techniques may help improve the fuel efficiency of a vehicle. A whole class of drivers, referring to themselves as "hyper-milers" has emerged. National contests in fuel efficient driving are even being held in certain locations.

Additionally, vehicle sensors can often easily report fuel efficiency to drivers, and it may further be possible to be advised on a whole range of vehicle statistics due to sensor reports provided both in a car and online.

SUMMARY OF ILLUSTRATIVE EMBODIMENTS

In one illustrative embodiment, a vehicle communication system includes a computer processor in communication with persistent and non-persistent memory. The system also includes a local wireless transceiver. The local wireless transceiver is in communication with the computer processor and is configured to communicate wirelessly with a wireless device located at the vehicle. A non-limiting example of such a device would be a cellular telephone. The system further includes at least one output device controllable by the processor.

In this embodiment, the processor is operable to communicate with at least one vehicle sensor. This could be a tire pressure sensor, a fuel efficiency sensor, a fuel gauge, an odometer, etc.

The processor is also operable to store a first vehicle statistic value in at least one of persistent and non-persistent memory. The first statistic value is based at least in part on information provided by the at least one vehicle sensor. For example, sensor could send an MPG average, or it could send an odometer reading used to calculate an MPG average. In both of these non-limiting examples, the MPG average may be what is stored as the first value.

The processor is also operable to calculate a second vehicle statistic value, based at least in part on information provided by the at least one vehicle sensor. Once a second value has been calculated, the processor is further operable to compare the second vehicle statistic value to the first vehicle statistic value.

In this illustrative embodiment, the processor is operable to report the second vehicle statistic value to a driver through the output device if a game being run by the processor instructs the processor to report the second vehicle statistic value.

In another non-limiting implementation, the vehicle communication system includes a vehicle statistic game stored in at least one of the persistent and non-persistent memory, executable by the processor. Execution of the vehicle statistic game causes the processor to prepare a first statistic value, based at least in part on information receive from a vehicle sensor. This preparation can include, but is not limited to, retrieval of stored statistic information, or calculation of new statistic information.

The processor may also calculate a second statistic value for comparison to the first statistic value, based at least in part on information receive from the vehicle sensor. Finally, in this embodiment, the processor may report at least the second statistic value to a driver, if there is a difference between the first statistic value and the second statistic value.

BRIEF DESCRIPTION OF THE DRAWINGS

Other aspects and characteristics of the illustrative embodiments will become apparent from the following detailed description of exemplary embodiments, when read in view of the accompanying drawings, in which.

DETAILED DESCRIPTION OF ILLUSTRATIVE EMBODIMENTS

The present invention is described herein in the context of particular exemplary illustrative embodiments. However, it will be recognized by those of ordinary skill that modification, extensions and changes to the disclosed exemplary illustrative embodiments may be made without departing from the true scope and spirit of the instant invention. In short, the following descriptions are provided by way of example only, and the present invention is not limited to the particular illustrative embodiments disclosed herein.

Figure 1:
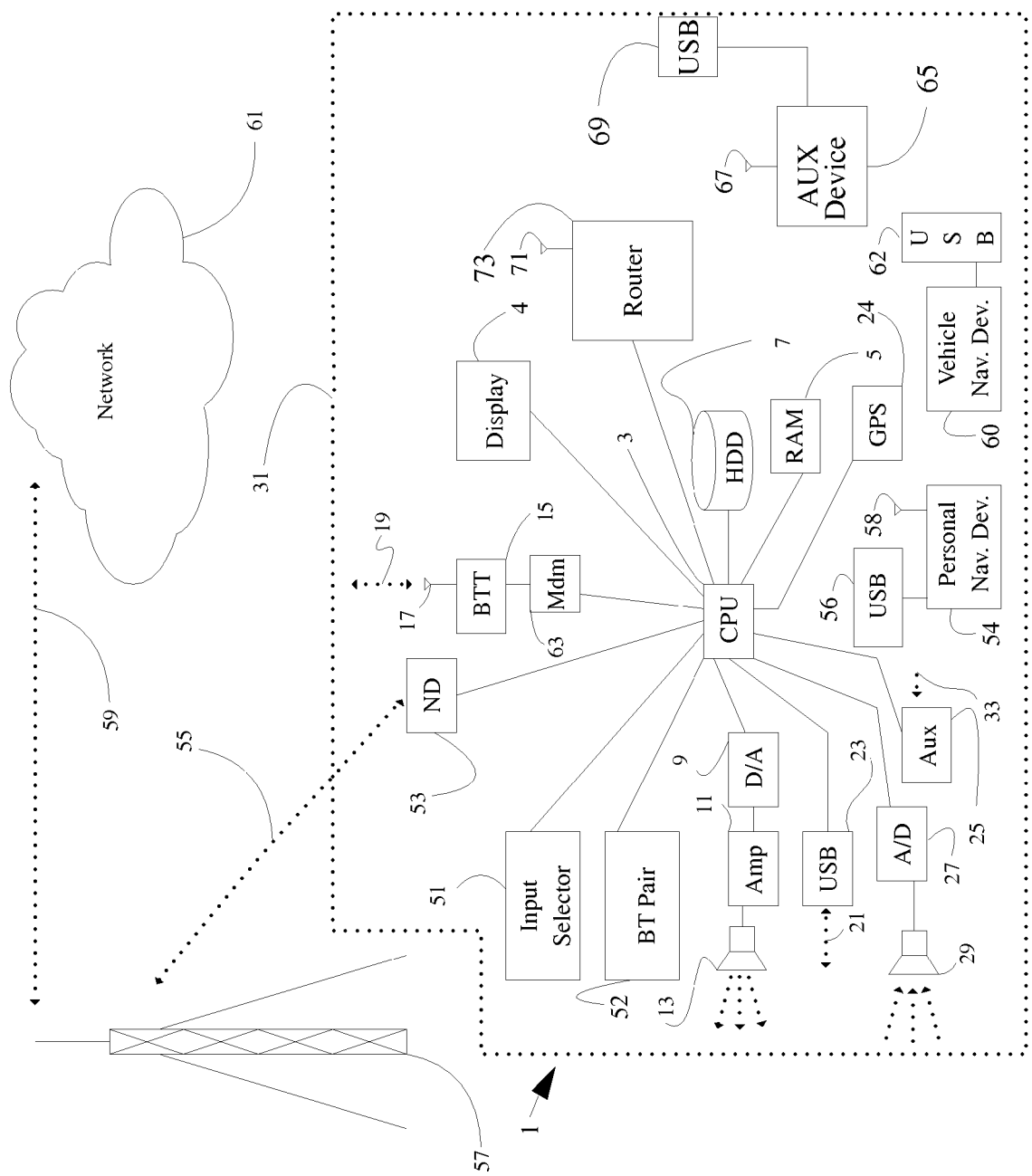
FIG. 1 shows an exemplary illustrative vehicle-based communication system with wireless capability.

FIG. 1 illustrates system architecture of an illustrative onboard communication system usable for delivery of directions to an automobile. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor.

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, etc.). The nomadic device can then be used to communicate 59 with a network 61 outside the vehicle 31 through, for example, communication 55 with a cellular tower 57.

Pairing a nomadic device 53 and the BLUETOOTH transceiver 15 can be instructed through a button 52 or similar input, telling the CPU that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 in order to transfer data between CPU 3 and network 61 over the voice band. In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is affixed to vehicle 31.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73.

Figure 2:
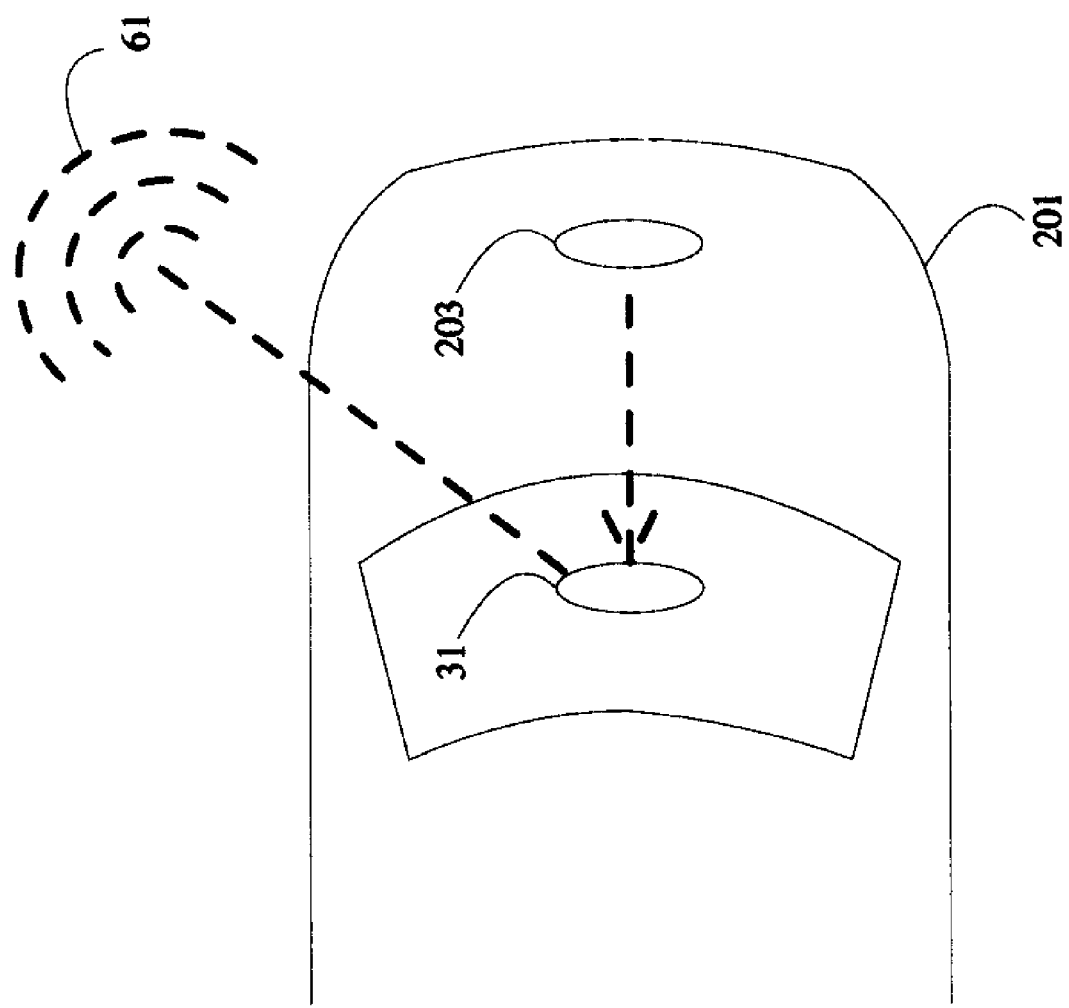
FIG. 2 shows illustrative exemplary communication between a vehicle sensor and a driver and a remote network.

FIG. 2 shows illustrative exemplary communication between a vehicle sensor and a driver and a remote network. In this illustrative embodiment, a first vehicle communication device 203 is in communication with a vehicle sensor. There could be a plurality of sensors in the vehicle, and they could communicate with a single communication device or a plurality of communication devices.

In this illustrative embodiment, the first communication device sends a signal to a vehicle-based computing system 31. This signal can be relayed to the driver in the form of output through, for example, an onboard display, the car audio system, a dashboard display, or any other suitable output device. The signal could also be relayed from the vehicle-based computing system to a remote network 61. Or, the signal may be relayed from the communication device 203 to the remote network 61.

Figure 3:
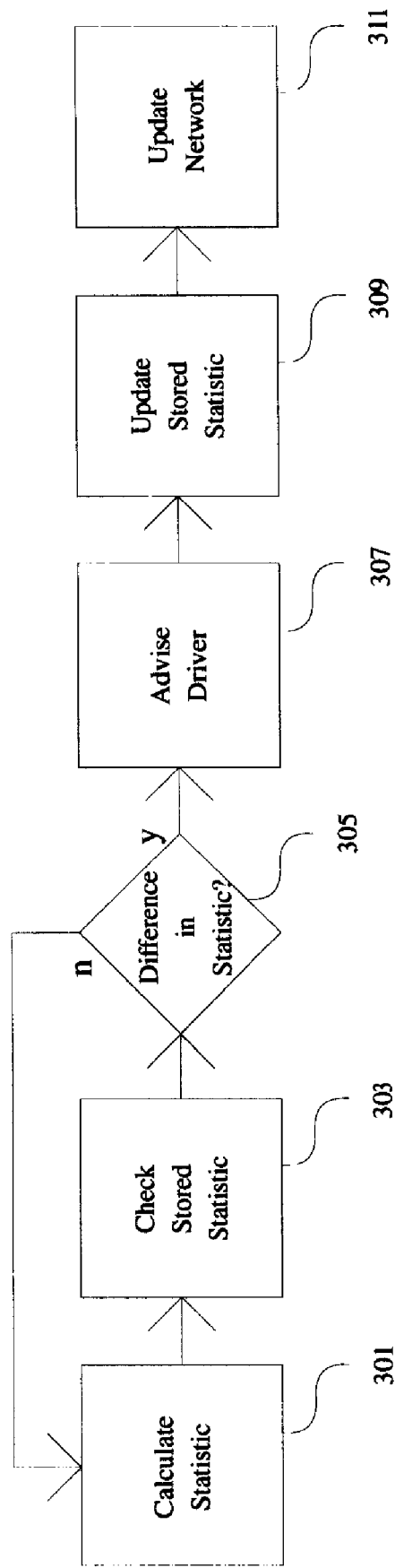
FIG. 3 shows an illustrative exemplary process for vehicle statistic game play and reporting.

FIG. 3 shows an illustrative exemplary process for vehicle statistic game play and reporting. In this illustrative process, a first statistic to be used for game play is calculated 301. Often, this calculation may be as simple as reading a vehicle sensor. Although the examples presented herein are often in terms of MPG, other vehicle based statistics could also be used to play games.

In one illustrative example, the game being played is a comparison game. For example, imagine that a driver's vehicle is presently averaging 27.9 MPG. The vehicle could constantly or periodically check the present MPG of the vehicle and the overall average MPG of the vehicle, and inform the driver if the driver's present MPG is improving or declining, as well as informing the driver if the overall average MPG of the vehicle is improving (due to, for example, more efficient driving by the driver).

The game could further measure MPG over certain trips, over days, weeks etc. All of this information could be reported to the driver on request, along with previous MPG information, so the driver could "compete" against him or herself. Alternatively or additionally, the information could be uploaded to a database, where the driver could compete against other drivers in area-wide (e.g., city, state, country, world) challenges. There could be challenges to have the best average MPG, the best daily MPG, etc.

This may help encourage drivers to be more conscious of their fuel efficiency, thus helping them conserve fuel.

In addition to MPG, other vehicle statistics could be used in games. For example, low tire pressure may lead to reduced MPG, increased blowouts, etc. So a tire pressure sensor could track how many days, for example, a driver's tires were within a recommended pressure range. A game such as this could help remind a driver to, for example, fill up tires when the weather turns cold, improving the overall safety of the driving experience. Similar games could be played with oil changes, regular maintenance, and any other factors that can be tracked by vehicle sensors.

Once the statistic(s) to be used has been calculated, the system proceeds to checking a stored statistic 303. This is the basis for a comparison. For example, if the average MPG of a vehicle was 29.3, then 29.3 may be the stored statistic. If the driver is presently averaging 29.7 MPG, then 29.7 may be the calculated statistic.

The exemplary system then compares the two statistics, looking for a difference 305. In this illustrative embodiment, any change is sufficient, but in other illustrative embodiments the change may need to be of a certain magnitude to warrant continuing.

If there is no difference between any of the statistics, then the system continues to calculate statistics and compare them to the stored statistics until a change registers. Once there is a difference between the statistics, the system advises the driver 307 that a change has occurred. This can be done on a positive or negative change, or may not be done at all, if a developer thinks such an advisory would be too distracting.

After the driver is advised of the change, the stored statistic is updated 309 if needed. For example, if the average is 29.3 and the present rate is 29.7, this may be sufficient to trigger a report to the driver, but the average MPG overall may not yet have changed. In instances such as this, updating would be skipped or result in the previously stored number being re-stored.

In addition to updating the stored statistic, a network stored statistic is also updated 311. In this illustrative implementation, a network based game is available to be played against other drivers, and updating the network allows for comparison of results. Additionally or alternatively, updating the network with the statistics can aid in overall tracking of a driver's performance over time and an archive for later retrieval of stored statistics.

Figure 4:
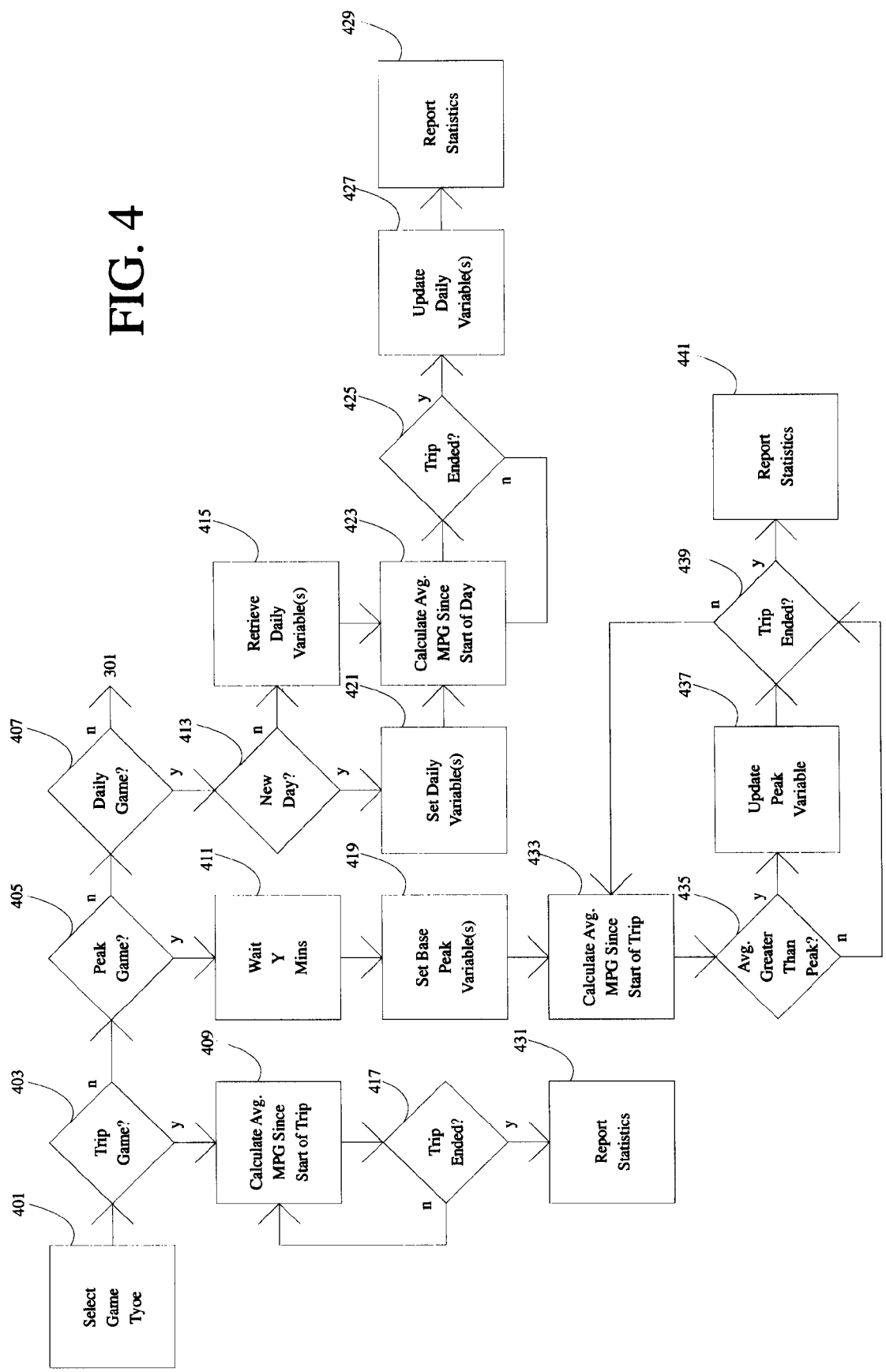
FIG. 4 shows an exemplary illustrative process for several illustrative non-limiting statistic games.

FIG. 4 shows an exemplary illustrative process for several illustrative non-limiting statistic games. In this illustrative embodiment, a user selects a game type 401. In this embodiment, there are choices of a trip game 403, a peak game 405, a daily game 407 and a default game 301. In this illustrative embodiment, the default game uses a lifetime average as the bar against which statistics are compared.

If a trip game is selected, the system calculates the average MPG since the start of the trip 409 and then checks to see if the trip has ended 417. This process is repeated throughout the trip, continuously or periodically. Another option would be to store the mileage at the start of the trip, compare it to the mileage at the end of the trip, and based on fuel usage, perform a calculation at the end of the trip.

In this illustrative embodiment, the trip ends when the vehicle is put in park, or when the vehicle is powered down, etc. Various measures could be used to gauge what constitutes a "trip" as appropriate. Once the trip has ended, statistics are reported 431. This can be a report to the driver, a report to a network, both, or other appropriate reporting.

If a peak game is selected, the system waits for a period of time 411 before performing a calculation. This is because the game eventually reports peak efficiency over the length of the trip. For example, 5 minutes into a trip, the average efficiency could be 22 MPG, 8 minutes in it could be 28 MPG and 15 minutes in it could be 25 MPG. But efficiency could vary wildly over a very brief period at the start, and the averages could be severely skewed. Hence the wait in this embodiment, although such a wait could be foregone.

After waiting, the system sets a base peak variable for comparison 419. The system then proceeds to calculate an average MPG since the start of the trip 433 and compare it to the base peak variable 435.

If the efficiency is now greater, the peak variable is updated 437, and the system checks to see if the trip has ended 439. A similar check is made if the efficiency is not greater. As long as the trip has not ended, the system continues to check an average efficiency against the peak variable. Once the trip has ended, statistics are reported 441. This can be a report to the driver, a report to a network, both, or other appropriate reporting.

If a daily game is selected, the system checks to see if a new day has started since the last time a daily game has been selected. Such a check can be made using an internal clock and a date stored with a daily game set of variables. If it is the same day, then the daily variables are retrieved 415, otherwise new daily variables are set 421. An average is calculated singe the start of the day 423, and a check is made to see if a trip has ended 425. If the trip has not ended, the calculation of the average continues, otherwise the daily variables are updated (for future use if needed) 427 and the statistics are reported 429. This can be a report to the driver, a report to a network, both, or other appropriate reporting.

In the daily example, a driver may wish to know, for example, the total fuel efficiency of a drive to and from work. Selecting the option may cause an initial mileage value to be recorded. Fuel usage can be tracked while the vehicle is in motion, and at the driver's arrival at work, fuel efficiency for the trip can be reported. Then, on the drive home in the evening, the initial mileage can be used again in combination with the old fuel usage and new fuel usage, and an aggregate daily average can be computed. This is just one example of how daily fuel economy could be calculated.

Figure 5:
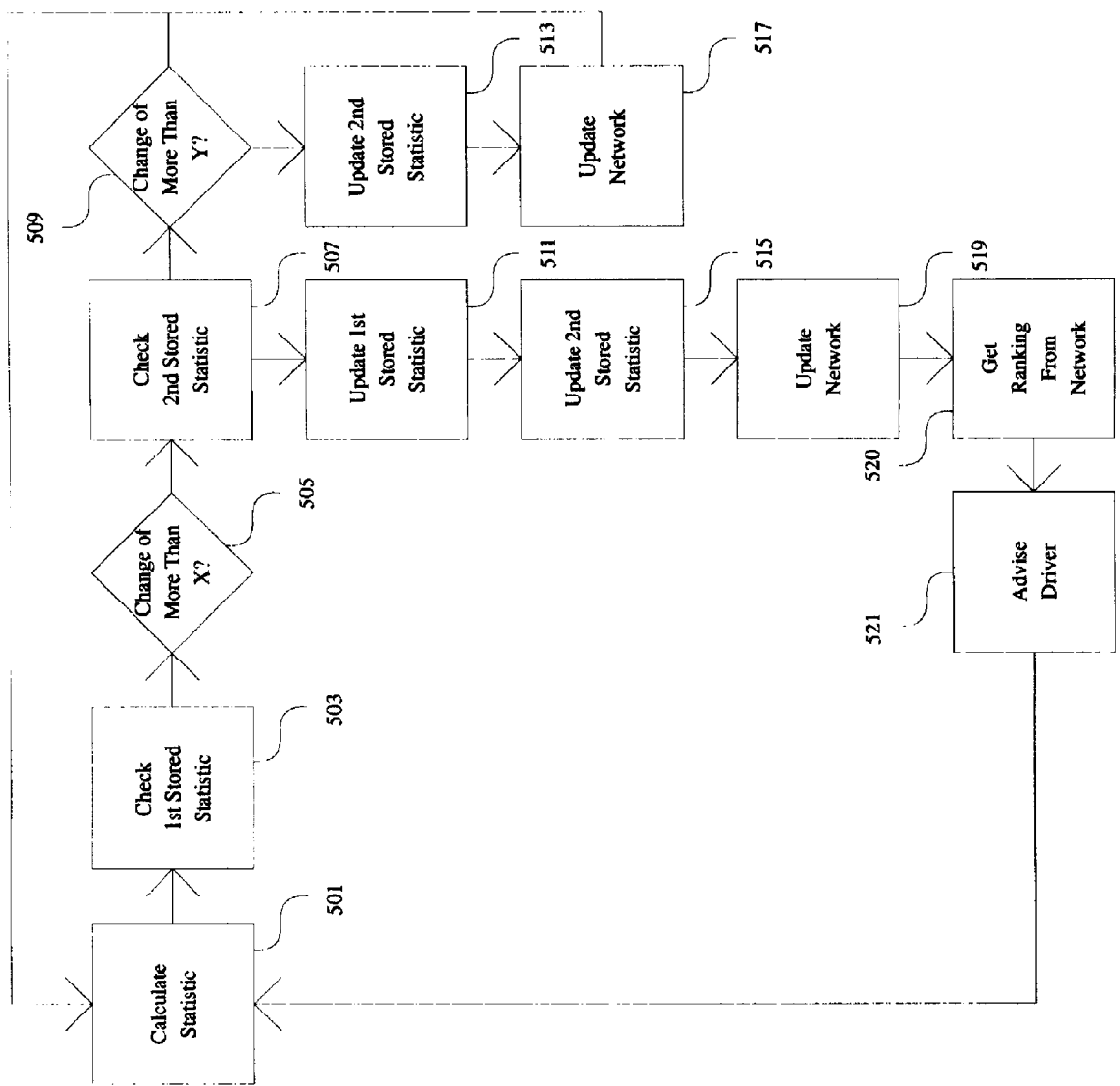
FIG. 5 shows a second illustrative exemplary process for vehicle statistic game play and reporting.

FIG. 5 shows a second illustrative exemplary process for vehicle statistic game play and reporting. In this illustrative embodiment, a statistic is stored more than once. In this embodiment, it is desired to keep a more precise track of statistics on a network, providing greater differentiation in a game, but at the same time it is recognized that constantly updating the driver with every minor change may become distracting and/or irritating. Accordingly, a first statistic is stored with which a driver update comparison will be made, and a second statistic is stored with which a network update comparison will be made. In this manner, it is possible to update the network more frequently than the driver, if so desired.

As with the illustrative embodiment shown in FIG. 3, a statistic to be used for the game is calculated 301. This calculation is compared against the first stored statistic 503. In this embodiment, it is desired to keep a more accurate rate of change on a network as compared to the accuracy with which changes are reported to the driver. In one non-limiting example, it may be desirable to tell the driver every time fuel efficiency changes by more than 0.25 MPG, but it may be desirable to update the network every time fuel efficiency changes by more than 0.01 MPG (thus providing greater variation between online scores and more accurate MPG reporting).

Accordingly, in this illustrative embodiment, X is set to 0.25, and Y is set to 0.01. The system first checks against a first stored statistic to see if the change is greater than X 505 (0.25 in this case). For example, if the game were an MPG game, and the current average MPG for the life of the vehicle were 26.2, then the first stored statistic might be 26.2. If the lifetime average of the vehicle changed to 26.3, then the difference would only be 0.1 and the driver would not be informed of the change. The system would also make a second check against a second stored statistic. This may be a more precise version of the first statistic, and may be, for example, 26.23 in the above case. If the lifetime average changes to 26.29, then the difference would be 0.06, which would be greater than the exemplary Y (0.01 in this example). Thus, a change of more than Y 509 would be detected.

If the change of more than Y is detected, then the second stored statistic is updated 513 and the network is updated 517 as well. In this particular implementation, the first statistic is not updated, even though the new MPG is closer to 26.3 than 26.2 (the old stored first statistic). This allows the driver to still achieve an in car notification, which may encourage the driver. For example, if the MPG improved by 0.06 every time an update was processed, then there would never be an increase of 0.25 at one time and the driver may never know how much better the efficiency is becoming. Accordingly, in this illustrative implementation, the first stored statistic is not updated until a change of X is detected.

Of course, it is also possible to update both statistics in either event if that is desired. Once the updating is done, the system returns to calculating statistics for another comparison.

If a change of more than X had been detected (for example, if lifetime MPG had risen to 26.5), then the first stored statistic would be updated 511. The second stored statistic would also be updated 515, since this is intended to be the more precise statistic in this illustrative embodiment (and thus the updating of it is processed along with the updating of the first statistic, since X>Y in this illustrative example).

In this embodiment, the network is updated 519 and a network ranking is also retrieved 520, to help inform the driver how that driver is faring against potential "competitors."

In this case, the driver has achieved a new level of MPG, so the driver is also informed of the change in statistics 521. This can help the driver to realize the gains being made (or lost) in fuel efficiency and encourage efficient driving (or behavior relevant to whatever statistic is being compared). The network ranking could also be reported at this point and the system returns to calculating statistics.

While the invention has been described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A vehicle communication system comprising:
   a computer processor in communication with persistent and non-persistent memory;
   a local wireless transceiver in communication with the computer processor and configured to communicate wirelessly with a wireless device located at the vehicle;
   at least one output device controllable by the processor;
   wherein the processor is operable to communicate with at least one vehicle sensor;
   wherein the processor is operable to store a first vehicle statistic value, based at least in part on information provided by the at least one vehicle sensor, in at least one of persistent and non-persistent memory;
   wherein the processor is operable to calculate a second vehicle statistic value, based at least in part on information provided by the at least one vehicle sensor;
   wherein the processor is further operable to compare the second vehicle statistic value to the first vehicle statistic value; and
   wherein the processor is operable to report the second vehicle statistic value to a driver through the output device if a game being run by the processor instructs the processor to report the second vehicle statistic value.

2. The system of claim 1, wherein the processor is operable to calculate a second vehicle statistic value continually.

3. The system of claim 1, wherein the processor is operable to calculate a second vehicle statistic value periodically.

4. The system of claim 1, wherein the processor is operable to compare the second statistic value to the first statistic value after each time the second statistic value is calculated.

5. The system of claim 1, wherein the processor is further operable to report the second statistic value to a remote network through the wireless device.

6. The system of claim 5, wherein the processor is further operable to receive ranking information from the remote network through the wireless device and is operable to report ranking information to the driver through the output device.

7. The system of claim 1, wherein the processor is operable to overwrite the first statistical value with the second statistical value if the second statistical value is different from the first statistical value.

8. The system of claim 1, wherein the game being run by the processor instructs the processor to report the second vehicle statistic value if second vehicle statistic value is different from the first vehicle statistic value.

9. The system of claim 8, wherein the game being run by the processor instructs the processor to report the second vehicle statistic value if second vehicle statistic value is different from the first vehicle statistic value by more than a predetermined amount.

10. The system of claim 1, wherein the second statistical value is a trip average MPG.

11. The system of claim 1, wherein the second statistical value is a daily average MPG.

12. The system of claim 1, wherein the second statistical value is a peak of average MPG over the length of a trip.

13. A vehicle communication system comprising:
    a computer processor in communication with persistent and non-persistent memory;
    a local wireless transceiver in communication with the computer processor and configured to communicate wirelessly with a wireless device located at the vehicle;
    at least one output device controllable by the processor; and
    a vehicle statistic game stored in at least one of the persistent and non-persistent memory, executable by the processor;
    wherein execution of the vehicle statistic game causes the processor to:
       prepare a first statistic value, based at least in part on information received from a vehicle sensor;
       calculate a second statistic value for comparison to the first statistic value, based at least in part on information received from the vehicle sensor
       report at least the second statistic value to a driver, if there is a difference between the first statistic value and the second statistic value.

14. The system of claim 13, wherein the processor preparing a first statistic value for comparison includes retrieving a stored statistic value.

15. The system of claim 13, wherein the processor preparing a first statistic value for comparison includes calculating an initial statistic value.

* * * * *